US005343223A

United States Patent [19]

Tohyama et al.

[11] Patent Number: 5,343,223

[45] Date of Patent: Aug. 30, 1994

[54] IMAGE FORMING APPARATUS

[75] Inventors: Yoshio Tohyama; Takayuki Ogawa, both of Kawasaki; Tatsuya Eguchi, Toyohashi; Norio Tamada, Tondabayashi; Satoshi Yoshida, Machida; Hirofumi Hasegawa, Hadano; Hitoshi Sekino, Chigasaki; Katsuyuki Taima, Hiratsuka; Akihito Ikegawa, Sakai; Kazuyoshi Hara, Isehara; Yasuhiro Matsuura, Atsugi; Hiroshi Mizuno, Machida, all of Japan

[73] Assignee: Minolta Camera Kabushiki Kaisha, Osaka, Japan

[21] Appl. No.: 795,011

[22] Filed: Nov. 20, 1991

[30] Foreign Application Priority Data

| | | | |
|---|---|---|---|
| Nov. 23, 1990 | [JP] | Japan | 2-319598 |
| Nov. 23, 1990 | [JP] | Japan | 2-319599 |
| Nov. 23, 1990 | [JP] | Japan | 2-319600 |
| Nov. 23, 1990 | [JP] | Japan | 2-319603 |

[51] Int. Cl.[5] ........ H04N 1/21; B41J 24/435

[52] U.S. Cl. ........ 346/108

[58] Field of Search ........ 346/108, 107 R, 76 L, 346/160, 139 R

[56] References Cited

U.S. PATENT DOCUMENTS

| | | | |
|---|---|---|---|
| 3,153,534 | 10/1964 | Eichler et al. | 271/61 |
| 4,344,713 | 8/1982 | Cullen | 400/22 |
| 4,348,101 | 9/1982 | Schonfeld et al. | 271/186 |
| 4,681,422 | 7/1987 | Oba et al. | 355/3 R |
| 4,740,817 | 4/1988 | Suzuki et al. | 355/14 SH |
| 4,873,548 | 10/1989 | Kobayashi et al. | 355/200 |
| 4,928,129 | 5/1990 | Honda | 346/160 |
| 4,965,640 | 10/1990 | Watarai et al. | 355/283 |
| 5,001,516 | 5/1991 | Maruyama et al. | 355/202 |
| 5,002,266 | 3/1991 | Kikuchi et al. | 271/3 |
| 5,047,803 | 9/1991 | Kanoto | 355/211 |

FOREIGN PATENT DOCUMENTS

| | | |
|---|---|---|
| 0331324 | 9/1989 | European Pat. Off. . |
| 0346934 | 12/1989 | European Pat. Off. . |
| 61-235853 | 10/1986 | Japan . |
| 61-235854 | 10/1986 | Japan . |
| 61-269169 | 11/1986 | Japan . |
| 63-193157 | 8/1988 | Japan . |

*Primary Examiner*—Mark J. Reinhart
*Attorney, Agent, or Firm*—Burns, Doane, Swecker & Mathis

[57] ABSTRACT

An image forming apparatus having a sheet storing unit for storing sheets therein along a bottom of a body of the apparatus, a sheet feeding mechanism for feeding the sheets stored in the sheet storing unit one by one toward a rear side of the body, a sheet path for leading each sheet fed by the sheet feeding mechanism upward, an image forming unit for forming an image on the sheet traveling in the sheet path, and a sheet ejecting unit for ejecting the image-formed sheet toward a front side of the body onto a sheet receiving portion disposed on an upper side of the body. The image forming unit is made as a cartridge containing a photosensitive member, a developing device, a transferring device and a cleaner. The cartridge is mounted in a holder which is movable between a cartridge exchange position and a set position.

19 Claims, 17 Drawing Sheets

36°

72°

90°

360°

IMAGE FORMING APPARATUS

BACKGROUND OF THE INVENTION

1. Field of the Invention

The present invention relates to an image forming apparatus, and more particularly to an image forming apparatus for forming a toner image on a sheet in an electrophotographic method.

2. Description of Related Art

In the art of laser printer, in order to make a compact printer, various improvements have been made on a sheet passageway therein. For example, Japanese Patent Laid Open Publication No. 1-317939 discloses that sheets are fed from a sheet cassette which is set along a bottom of a printer body toward a front side of the body (a side where an operation panel is disposed), that each fed-out sheet receives an image while being conveyed upward in the front side and that the image-formed sheet is ejected toward a rear side of the body onto a tray disposed on an upper side of the body. The sheet passageway in the printer is formed substantially along the inner wall of the printer body, and this contributes to the compactness of the printer. However, this printer has a problem in sheet ejection. Image-formed sheets ejected from the printer are collected on the rear side of the printer body, that is, the sheets are collected in a far side from an operator, which is inconvenient to the operator.

Focusing on a sheet feeding mechanism, conventional laser printers and electrophotographic machines generally adopt a mechanism wherein a sheet is first fed out of a stack of sheets horizontally and then conveyed upward guided by a plate (refer to Japanese Patent Publication No. 2-31465). The horizontal sheet feed-out of this mechanism makes it difficult to make a compact image forming apparatus. Also, there is much possibility of occurring sheet jamming in the apparatus.

Now regarding a sheet feeding section for supplying sheets to an image transfer section, an image forming apparatus such as a laser printer or an electrophotographic machine conventionally employs a detachable sheet cassette containing a stack of sheets and/or a manual sheet feed tray disposed on an outside frame of a body of the apparatus.

A sheet cassette used as the sheet feeding section is exclusive for a size of sheets, and in order to supply different sizes of sheets, it is required to prepare several sheet cassettes. However, this is costly. Further, in order to make it possible to supply sheets which cannot be placed in any of the prepared cassettes, the manual sheet feed tray must be provided. Generally, the manual sheet feed tray is space-consuming, that is, the tray is protruded laterally from the body of the apparatus.

Incidentally, recently an image formation cartridge is used in an image forming apparatus, and U.S. Pat. No. 4,786,938 proposes an image formation cartridge containing not only a photosensitive member but also transferring means. The photosensitive member and the transferring means face each other with a sheet path in-between. In this type of image formation cartridge, the surface of the photosensitive member does not need to be protruded from a housing of the cartridge for image transfer. Thus the photosensitive member is well protected by the housing.

However, when a roller is used as the transferring means in the image formation cartridge, there occurs a problem in treating sheet jamming. In the cartridge, the transfer roller is always in contact with and pressed against the photosensitive member. When a sheet is stuck between the transfer roller and the photosensitive member and also stuck between other transporting rollers, if the image formation cartridge is displaced for treatment of the jammed sheet, the sheet may be torn up or the photosensitive member may have a scratch.

SUMMARY OF THE INVENTION

An object of the present invention is to provide a compact and convenient image forming apparatus.

Another object of the present invention is to provide a sheet feeding mechanism which shortens a sheet passageway in an image forming apparatus and which inhibits occurrence of sheet jamming in the apparatus.

A further object of the present invention is to provide a compact image forming apparatus having a built-in sheet feed tray on which an operator standing in front of the apparatus can set sheets easily.

Furthermore, another object of the present invention is to provide an image forming apparatus wherein an image formation cartridge containing a photosensitive member and transferring means can be displaced from an image forming position without damaging a jammed sheet nor the photosensitive member.

In order to attain the objects above, an image forming apparatus according to the present invention comprises: means for storing sheets therein along a bottom of a body of the apparatus; means for feeding the sheets stored in the sheet storing means one by one toward a rear side of the apparatus; a sheet path for leading each sheet fed by the sheet feeding means upward; means for forming an image on the sheet traveling in the sheet path; and means for ejecting the image-formed sheet toward a front side of the apparatus onto a sheet receiving portion disposed on an upper side of the body.

In the image forming apparatus, the sheet passageway is formed along an inner wall of the body, and therefore the apparatus is compact. Also, image-formed sheets are ejected from the body toward the front side, that is, toward an operator, and therefore the operator can pick up the sheets easily.

In the image forming apparatus, further, image forming means is formed as a unit comprising a photosensitive drum and a developing device, and the unit is mounted in the body of the apparatus in such a manner to be surrounded by the sheet storing means, the sheet path and the sheet ejecting means. This also contributes to the compactness of the apparatus.

In order to make the apparatus more compact, a laser beam optical system is arranged in such a manner to be partly located between the image forming means and the sheet storing means.

The image forming apparatus further comprises: means for holding the image-formed sheet upright; and means, which is disposed immediately before an exit of the sheet path, for switching the destination of the image-formed sheet between the sheet receiving portion disposed on the upper side of the body and the upright sheet holding means. The upright holding means is to receive the image-formed sheet in a face-up ejection mode. When the switching means is switched so as to transport the image-formed sheet to the upright holding means, the sheet is ejected onto the holding means with its imaged side facing to the front. This is convenient for checking the image. Also, the holding means consumes no horizontal space because it is upright.

In the image forming apparatus, preferably the sheet feeding means comprises a feed roller and a pinch roller in contact with the feed roller for directing a sheet to travel along a circumference of the feed roller. With the sheet feeding means of the structure, a sheet is fed out of the sheet storing means by the feed roller and immediately is conveyed upward by the pinch roller. In other words, the sheet heads upward without proceeding horizontally. This structure shortens the sheet passageway and contributes the compactness of the apparatus. Also, this structure inhibits occurrence of sheet jamming.

Another image forming apparatus according to the present invention comprises: an opening formed on a front side of a body of the apparatus, through which opening sheets are set in the body; a sheet storing section formed in the body, in which section the sheets set through the opening are stored in a stack; and means for feeding the sheets stored in the sheet storing section to an image forming section one by one. The structure facilitates sheet setting in the apparatus. An operator can set sheets in the apparatus through the opening easily, staying at an operating position (near a side where an operation panel is disposed). In the structure, the sheet storing Section is formed inside the body of the apparatus, not protruded from the body. Thus the sheet storing section does not consume a space.

The image forming apparatus has a cover member which is movable between a position to cover the opening and a position to uncover the opening. The cover member prevents dust from entering the body of the apparatus. Also, when the apparatus is carried, the cover member prevents sheets in the sheet storing section from slipping out thereof. Preferably the cover member is made of a transparent material so that the operator can see the sheet storing section even while the cover member covers the opening.

Further, the image forming apparatus comprises means for holding the cover member in the uncovering position, and the cover member held in the uncovering position receives sheets ejected from the body of the apparatus. In other words, the cover member can act as a tray for receiving image-formed sheets ejected from the body of the apparatus.

The image forming apparatus has sheet feeding means near edges of sheets stored in the sheet storing section, which edges are farther from the opening. The sheets are fed from the sheet storing section to the image forming section with the edges being leading edges. In other words, leading edges of sheets when the sheets are set in the body of the apparatus become leading edges when the sheets are fed to the image forming section, and this sheet feeding manner only requires simple sheet feeding means.

The feeding means is disposed in a place lower than the opening, and the sheet storing section slants downward from the opening to the sheet feeding means. Also, farther from the opening, shorter distance between an upper wall and a lower wall of the sheet storing section. This structure facilitates sheet setting in the body of the apparatus. The operator needs to only slide sheets along the downward slope of the sheet storing section, and the upper and the lower wall of the sheet storing section guide the sheets.

The image forming apparatus further has a laser beam optical system, and a bottom of a housing of the optical system serves as the upper wall of the sheet storing section. The bottom of the housing has recesses on both sides in respect to a sheet setting direction. The recesses form an additional space in the rear side of the sheet storing section, and therefore the operator can easily take a small size of sheets such as postcards out of the sheet storing section.

Another image forming apparatus according to the present invention comprises: an image formation cartridge containing a photosensitive member, a developing device, a transferring device and a cleaner; and means for holding the image formation cartridge and sheet transporting means disposed around the transferring device, the holding means being movable between a cartridge exchange position and a set position.

The sheet transporting means immediately before and after the transferring device is held by the holding means, and is movable between the cartridge exchange position and the set position together with the image formation cartridge. Even when sheet jamming occurs with a sheet stuck between the photosensitive member and the transferring device and also stuck in the sheet transporting means, the image formation cartridge can be moved to the cartridge exchange position without damaging the sheet nor the photosensitive member.

The image forming apparatus further comprises: sheet transporting means which is not held by the holding means, the sheet transporting means having a pair of rollers which are in contact with and pressed against each other to transport a sheet; and means for separating the pair of rollers from each other in synchronization with movement of the image formation cartridge to the cartridge exchange position. In this structure, even when sheet jamming occurs with a sheet stuck in the image formation cartridge and also in the sheet transporting means not held by the holding means, the cartridge can be moved to the cartridge exchange position without damaging the sheet nor the photosensitive member because the sheet is released from the pair of rollers of the sheet transporting means in synchronization with the movement of the cartridge.

BRIEF DESCRIPTION OF THE DRAWINGS

These and other objects and features of the present invention will become apparent from the following description taken in conjunction with the preferred embodiments thereof with reference to the accompanying drawings, in which.

Figure 10:
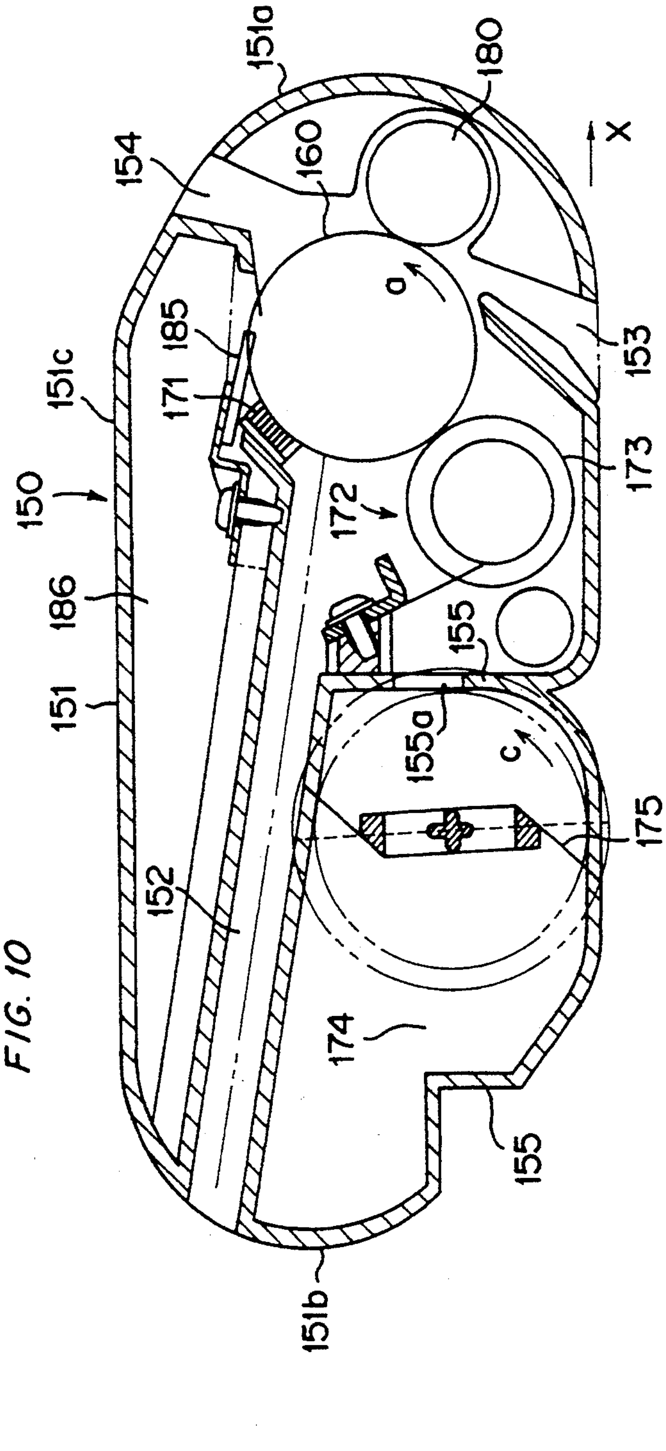
Figure 11:
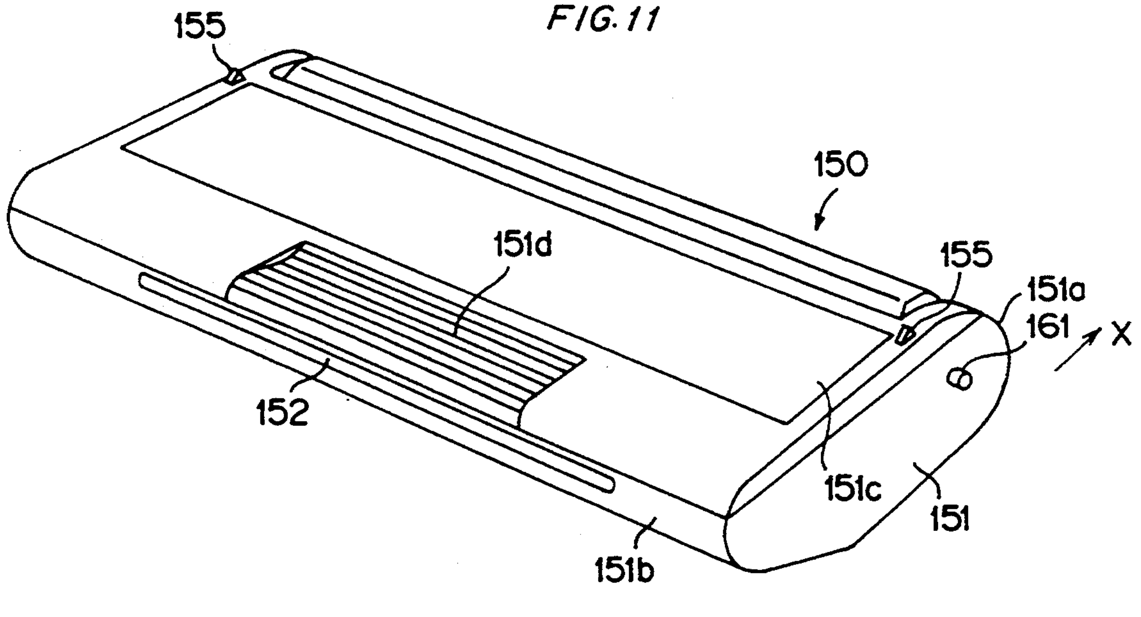
Figure 12:
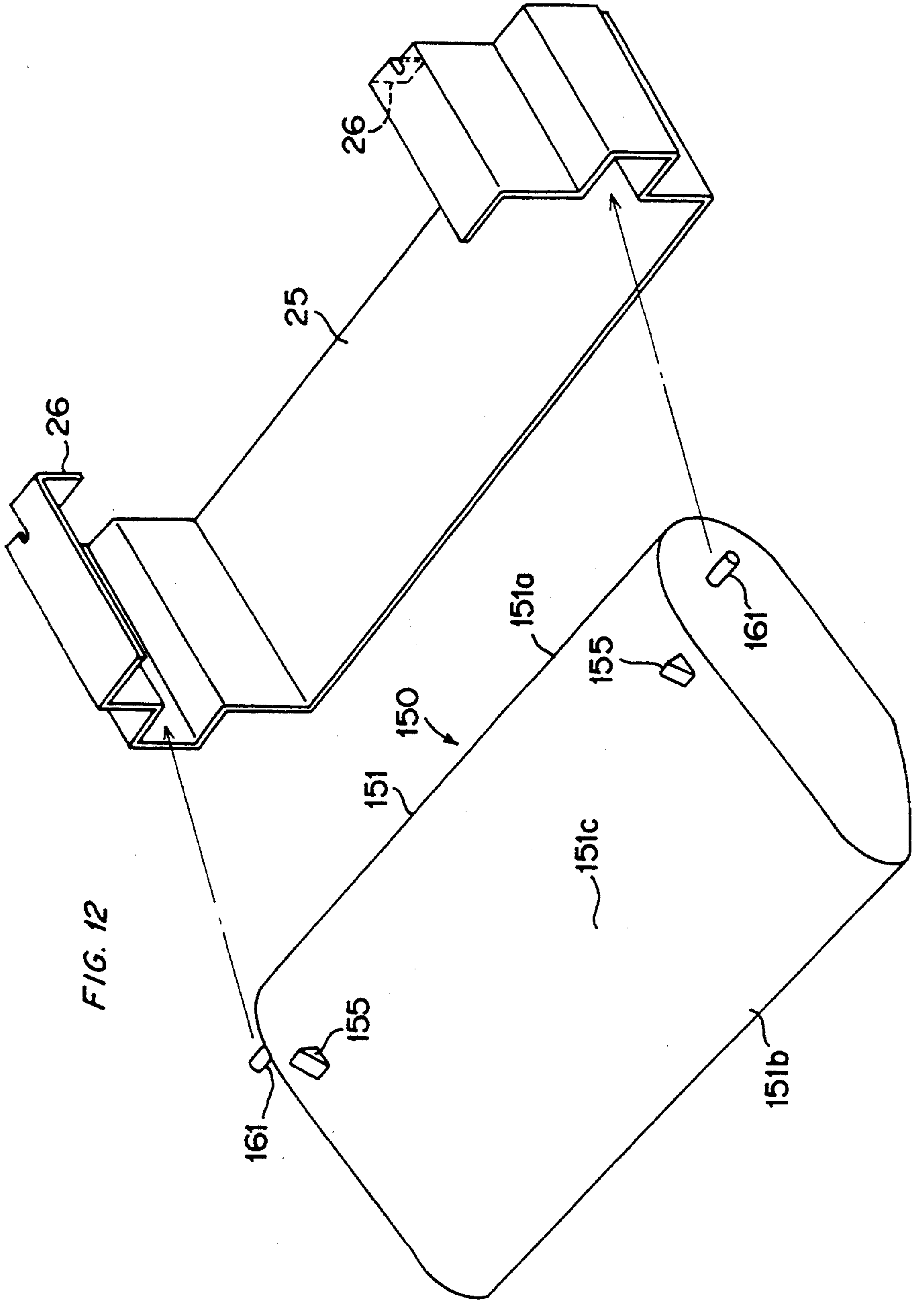
Figure 13:
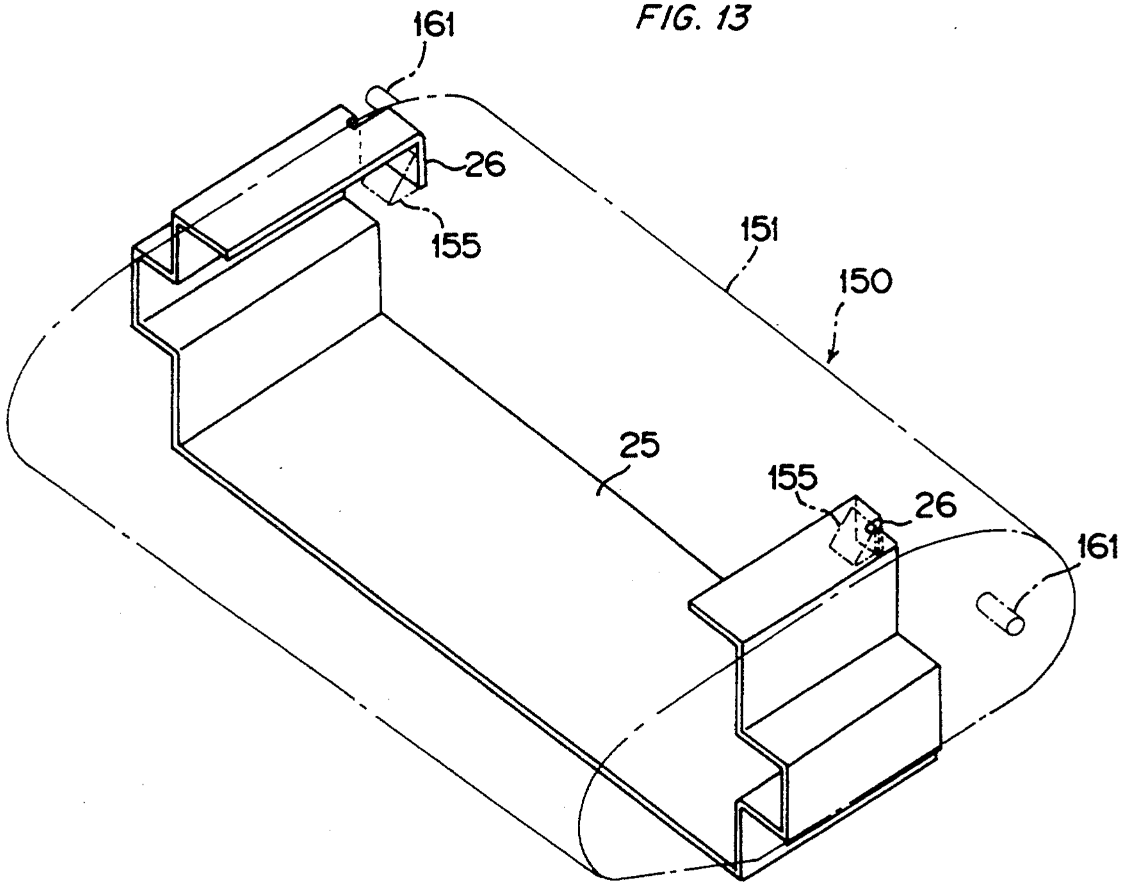
Figure 14:
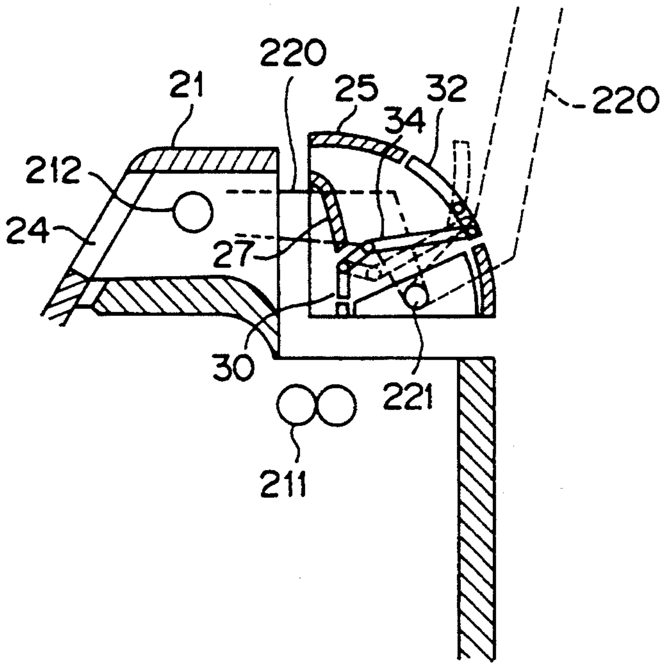
Figure 15:
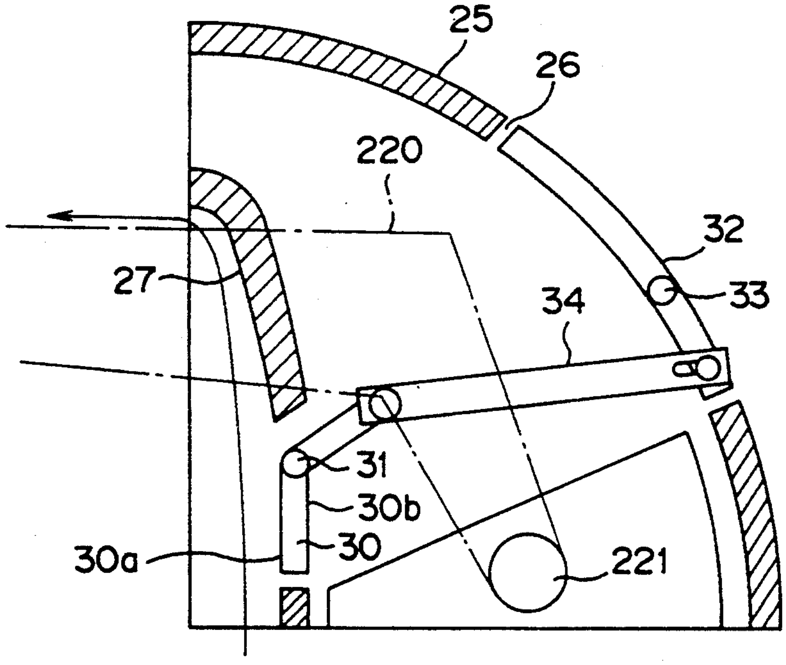
Figure 16:
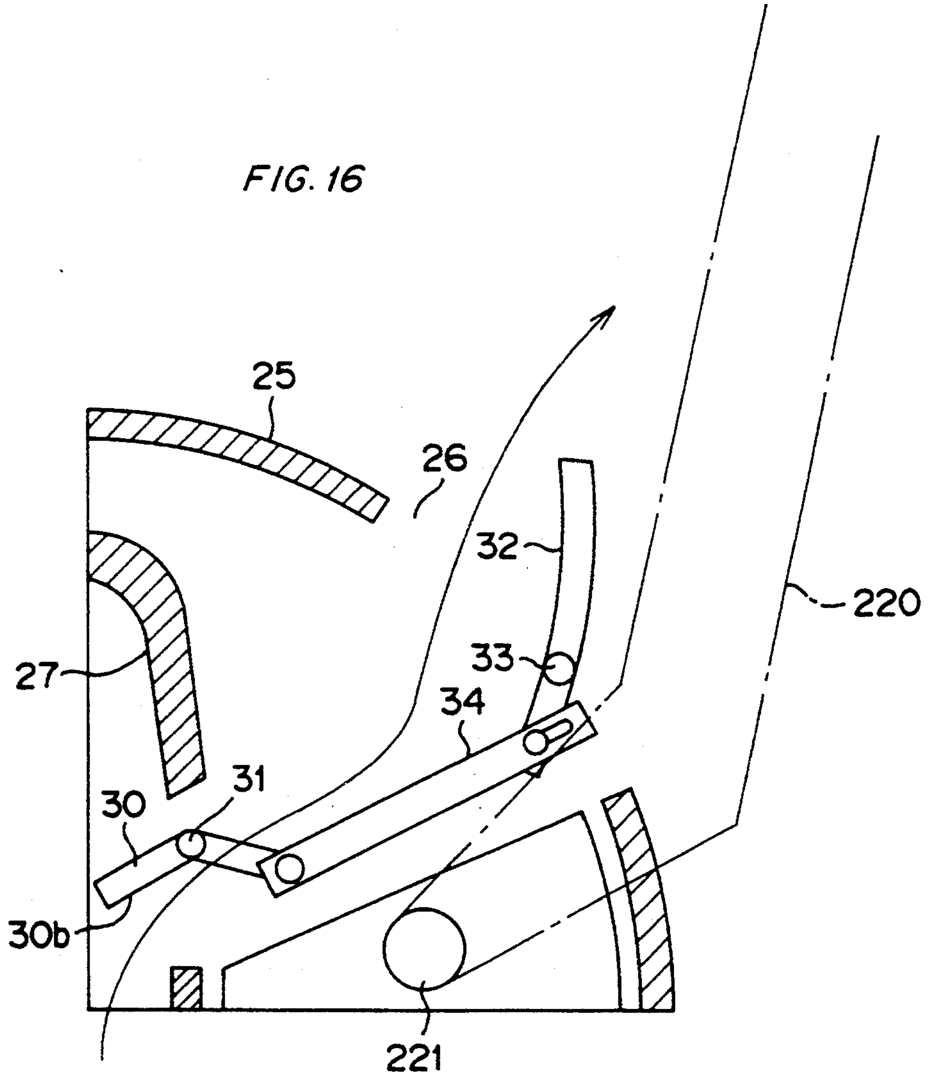
Figure 17:
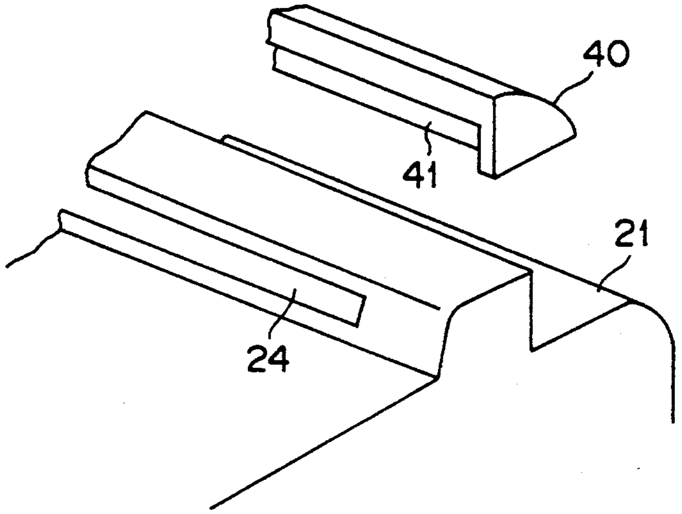
Figure 18:
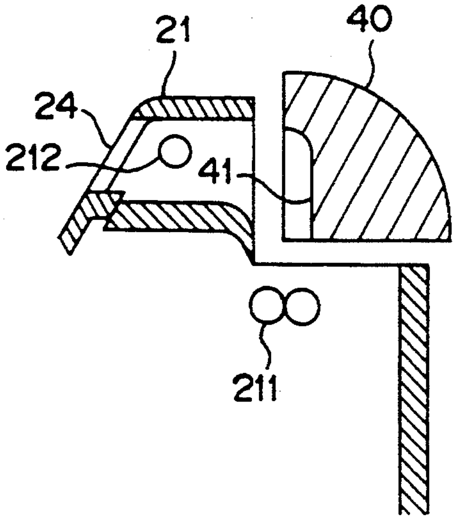
Figure 19:
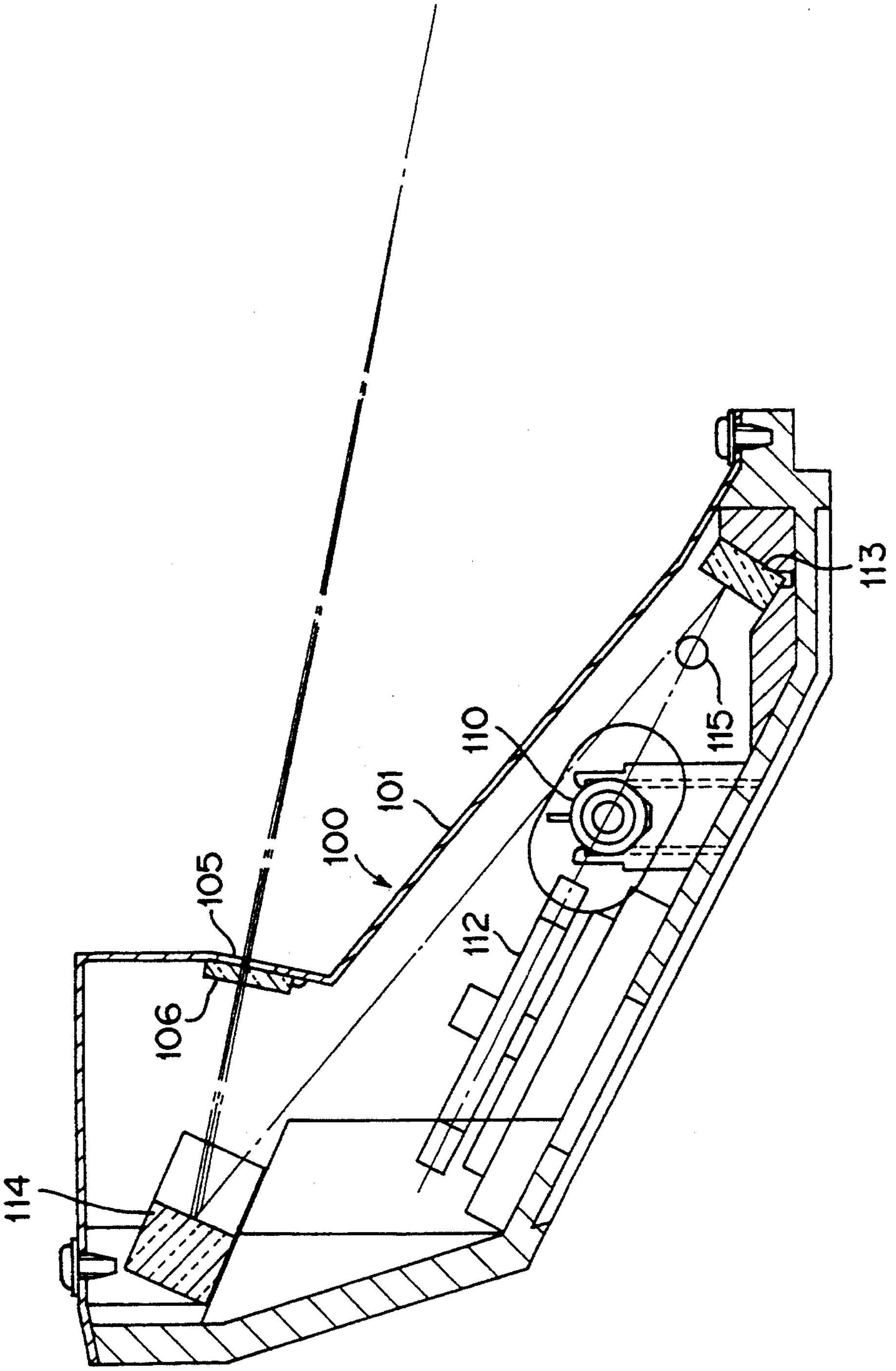
Figure 20:
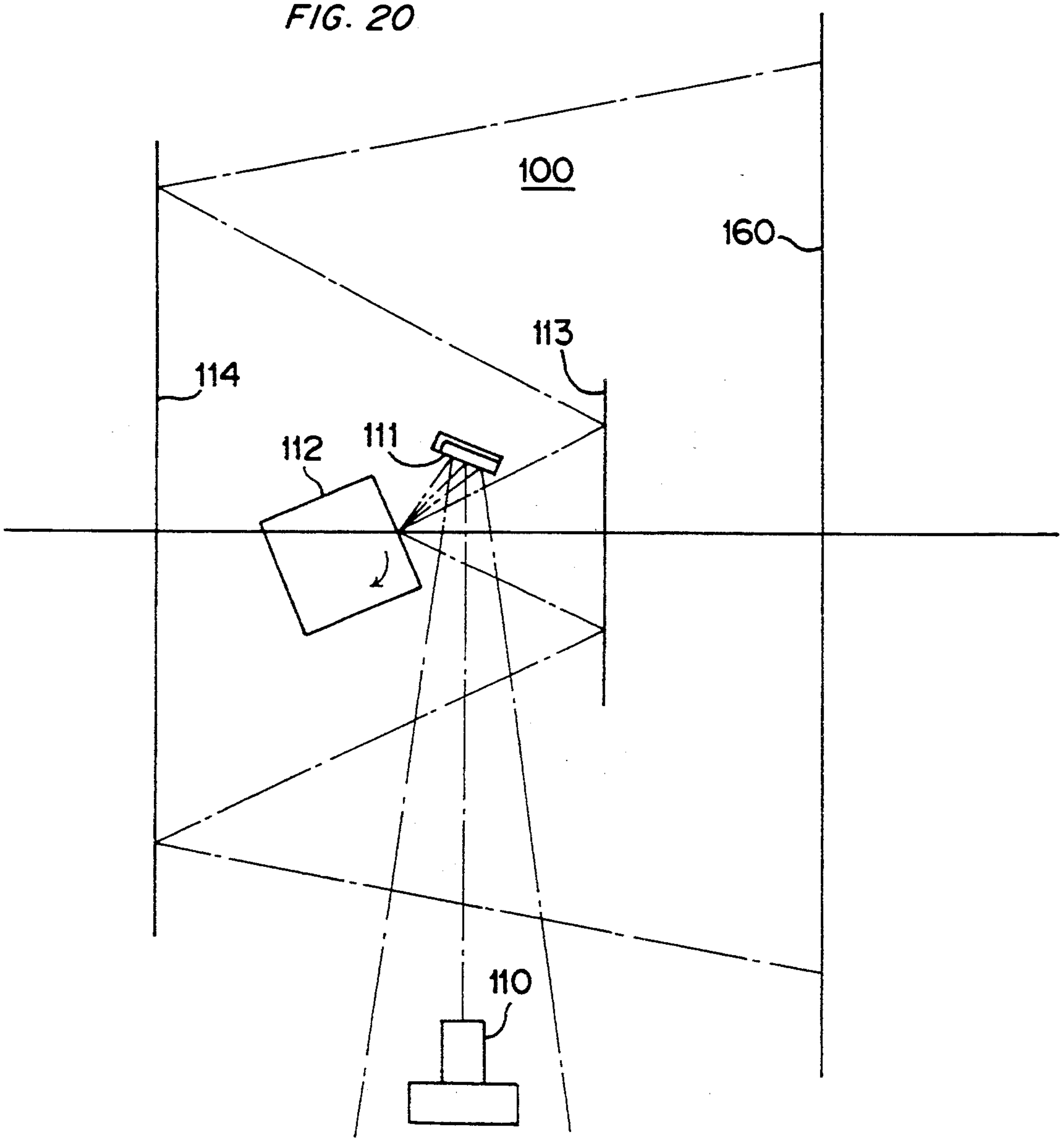
Figure 21:
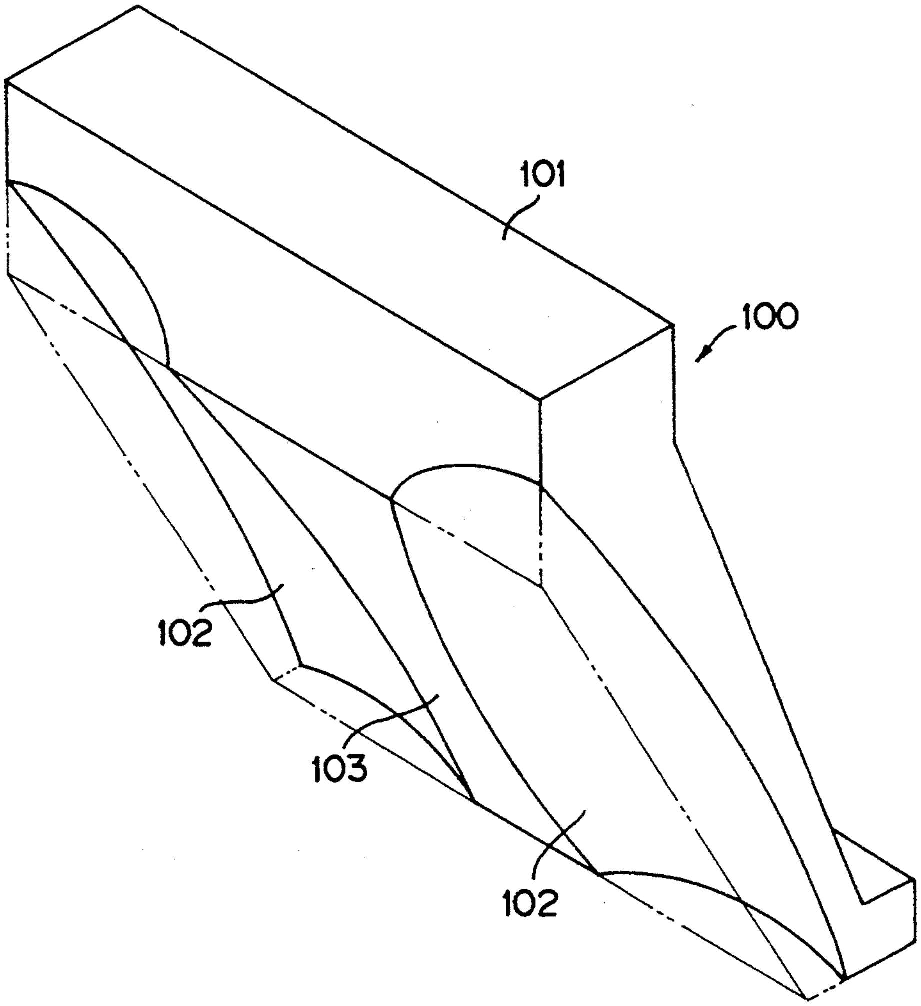

FIGS. **9*a* through 9*d*** are side views of the sheet feeding mechanism, showing rotation of the feed rollers and position of the push-up sticks;

FIG. 10 is a sectional view of an image formation cartridge;

FIG. 11 is a perspective view of the image formation cartridge;

FIG. 12 is a perspective view of the image formation cartridge and a holder;

FIG. 13 is a perspective view of the image formation cartridge mounted in the holder;

FIG. 14 is a sectional view of a sheet ejection switching block;

FIGS. 15 and 16 are enlarged sectional views of the sheet ejection switching block;

FIG. 17 is a perspective view of a sheet guide block;

FIG. 18 is a sectional view of sheet ejection means provided with the sheet guide block;

FIG. 19 is a sectional view of a laser beam optical system unit;

FIG. 20 is a schematic illustration of an optical path of the optical system unit; and FIG. 21 is a perspective view of the optical system unit.

DETAILED DESCRIPTION OF THE PREFERRED EMBODIMENTS

An embodiment of the present invention is hereinafter described.

General Structure

The embodiment is a compact laser printer wherein an electrostatic latent image is recorded with a laser beam on a photosensitive member and developed into a toner image thereon, and the toner image is transferred to a sheet.

Figure 1:
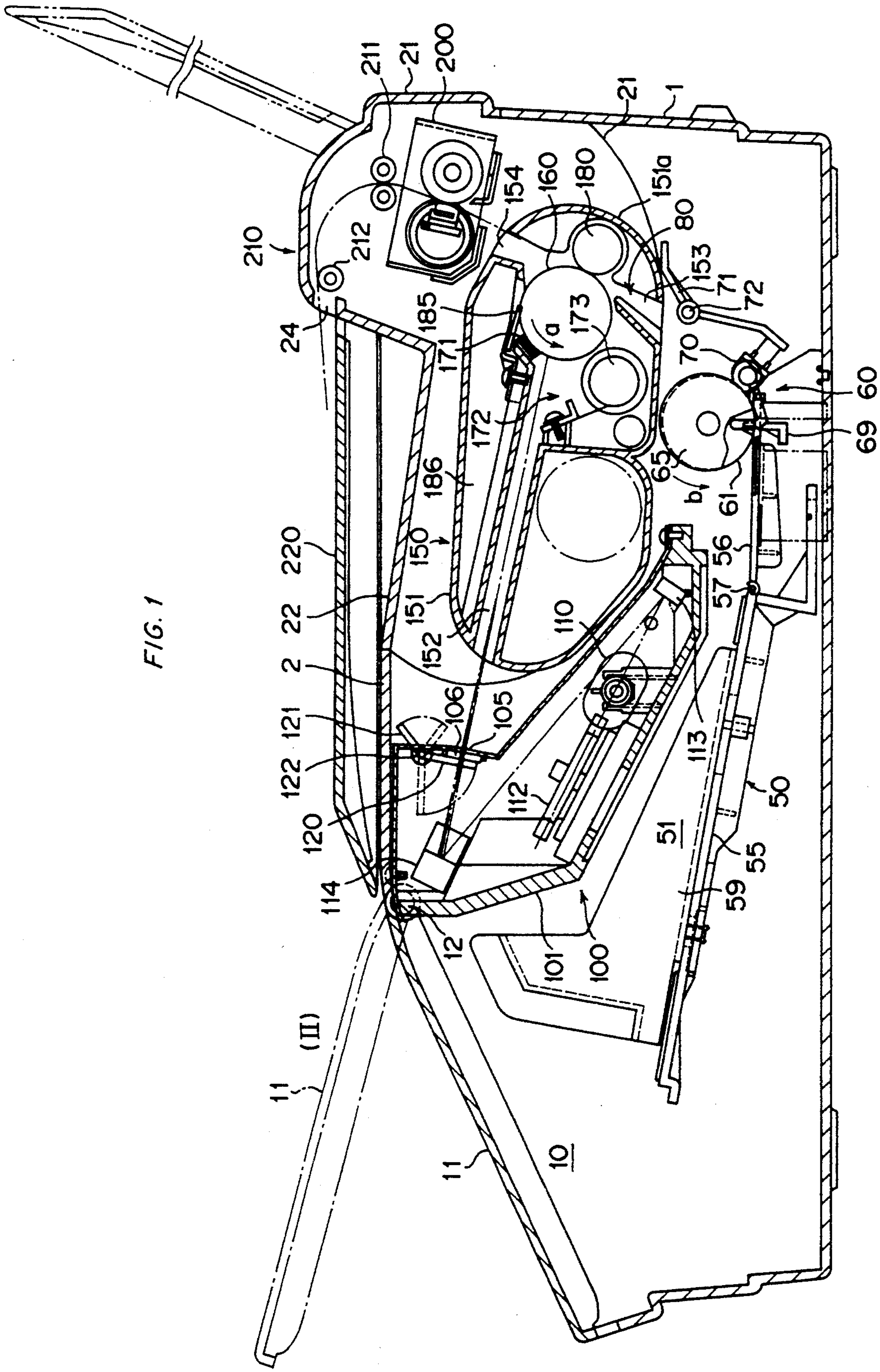
FIG. 1 is a sectional view of a laser printer according to the present invention, showing its internal composition.

The printer, as shown in FIG. 1, comprises a sheet storing unit 50, a laser beam optical system unit 100 and an image formation cartridge 150 in a printer body frame 1. An operation panel is disposed on the left upper surface in FIG. 1, and a front side and a rear side of the printer correspond to the left side and the right side in FIG. 1 respectively.

The image formation cartridge 150 is made by integrating a photosensitive drum 160, a charging brush 171, a developing device 172, a transfer roller 180 and a cleaning blade 185. The photosensitive drum 160 is rotated in a direction of arrow a. First, the surface of the photosensitive drum 160 is charged by the charging brush 171 to have a specified value of potential, and a laser beam enters the cartridge 150 through a slit 152 formed on a housing 151 and forms an electrostatic latent image on the photosensitive drum 160. The electrostatic latent image is developed into a toner image while passing the developing device 172.

Figure 6:
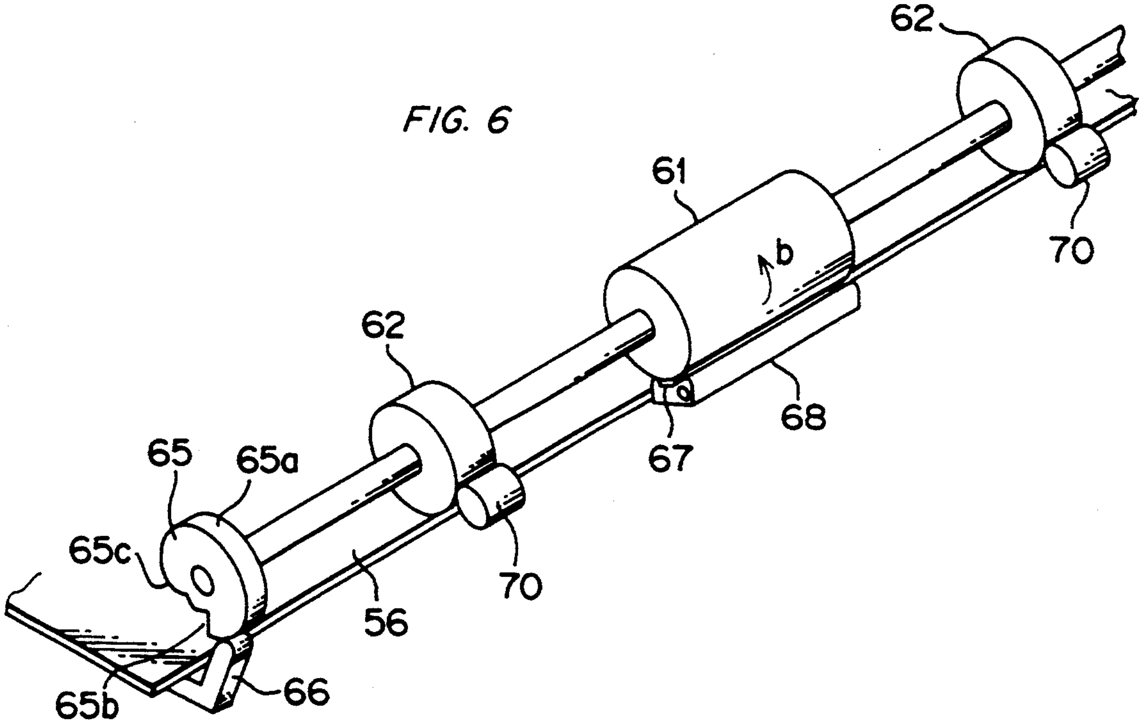
FIG. 6 is a perspective view of a sheet feeding mechanism.

A maximum of approximately 50 sheets are stacked on a tray 55 of the sheet storing unit 50, and the sheets are fed out thereof one by one according to rotation of feed rollers 61 and 62 (see FIG. 6). A fed-out sheet is conveyed right-upward in FIG. 1, pinched by the feed rollers 62 and pinch rollers 70. Then, the sheet enters the cartridge 150 through a sheet guide slit 153 formed on the housing 151, and is conveyed to a nip portion between the photosensitive drum 160 and the transfer roller 180 where the sheet receives the toner image. Then, the sheet is conveyed to a fixing device 200 through a sheet guide slit 154. Thereafter, the sheet is ejected through ejection rollers 211 onto the upper surface of the body frame 1 with its printed side facing down, or onto the front side of an upright tray 220 with its printed side facing to the front as indicated by the two-dot chain line in FIG. 1.

The photosensitive drum 160 continues rotating in the direction of arrow a after the image transfer. The cleaning blade 185 removes residual toner from the drum 160, and the rubbish toner is collected in a rubbish toner room 186 located in the upper part of the cartridge 150.

Sheet Storing Unit

The sheet storing unit 50 has a sheet room 51 divided by the tray 55 for holding a stack of sheets thereon and the bottom of a housing 101 of the optical system unit 100.

Figure 4:
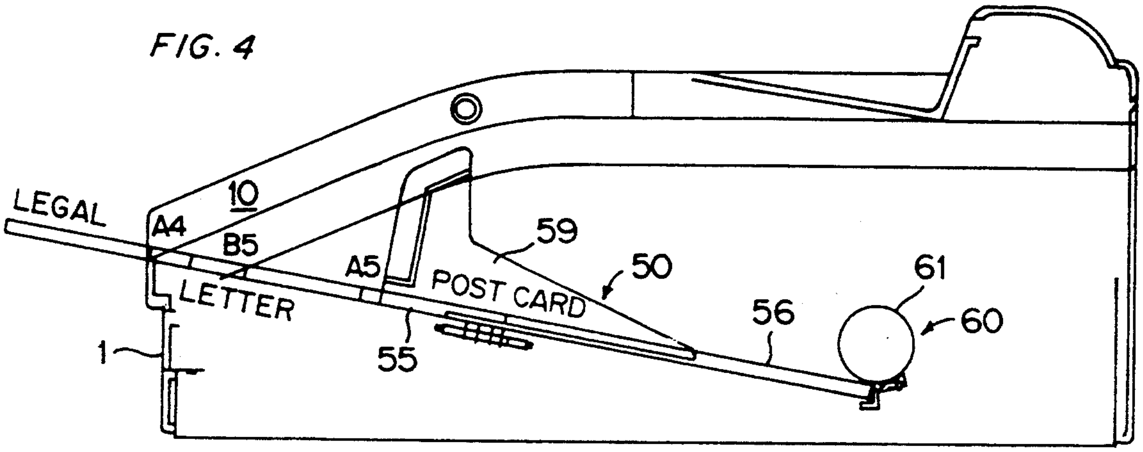
FIG. 4 is a sectional view of the laser printer, showing set positions of different sizes of sheets on a tray.

The tray 55 can be drawn to the front (to the left in FIG. 1), and the drawing amount depends on the size of sheets to be stored in the sheet room 51. The sheets are set in the sheet room 51 with their longitudinal sides parallel with the direction of sheet feeding. FIG. 4 shows set positions of different sizes of sheets. The tray 55 is drawn by a maximum amount when a legal size of sheets are to be stored in the room 51. In this case, the tray 55 protrudes from the body frame 1 and holds trailing edges of the sheets. A pair of side regulation members 59 is disposed on the tray 55, and the side regulation members 59 are slidable along the latitudinal sides of sheets stored in the room 51. The side regulation members 59 are to keep the sheets in alignment in respect to the width of the sheets.

The body frame 1 has an opening 10 at the front side, and the opening 10 is covered with a cover 11. Sheets are put in the sheet room 51 through the opening 10. The cover 11 is pivotable up and down on a pin 12. An operator raises the cover 11 to a position (I) shown in FIG. 5 when putting sheets in the room 51. When long sheets such as an A4 size or a legal size of sheets are set in the room 51, the trailing edges of the sheets are left outside the printer, and therefore the cover 11 is kept open as indicated by a position (II) in FIGS. 1 and 5.

Figure 5:
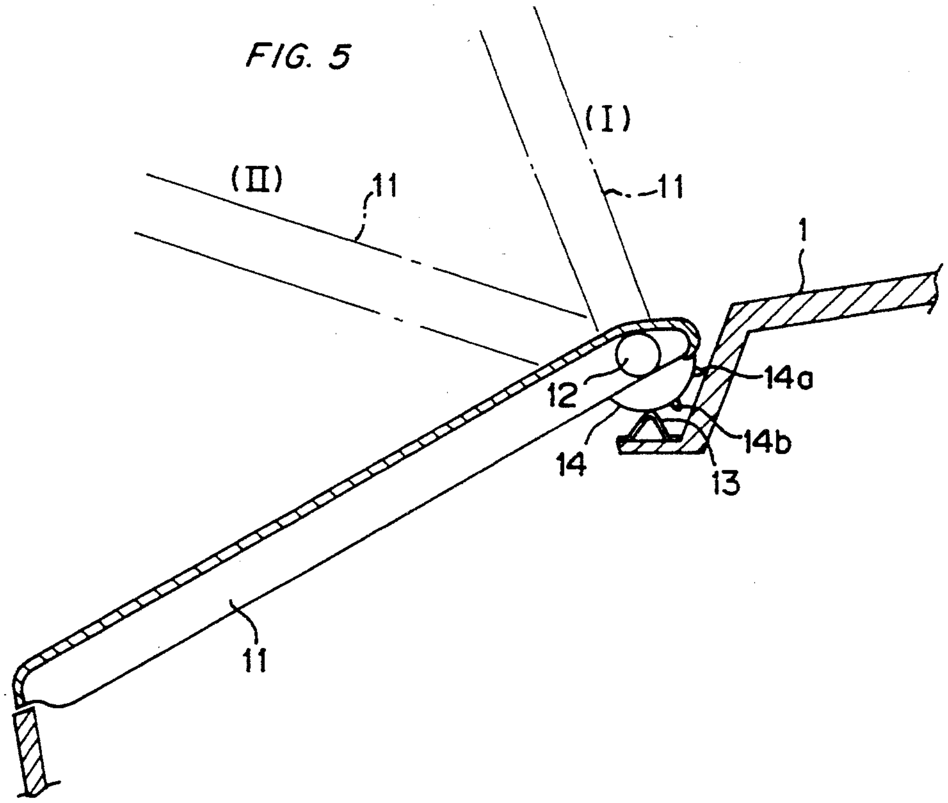
FIG. 5 is a partially sectional view of a cover of an opening through which sheets are set in the laser printer.

In order to hold the cover 11 in the positions (I) and (II), as shown in FIG. 5, a plate spring 13 is fastened to the body frame 1, and a cam 14 having projections **14*a* and 14*b* are disposed on the pivot of the cover 11. The cam 14 is always in contact with the plate spring 13 even while the cover 11 is pivoting. The cover 11 pivots upward, and when the projection 14*b* comes through the plate spring 13, the cover 11 is held in the position (II). The cover 11 further pivots upward, and when the projection 14*a* comes through the plate spring 13, the cover 11** is held in the position (I).

The cover 11 is made of a transparent material such as acrylic resin, so that the operator can see sheets in the sheet room 51 even when the opening 10 is closed by the cover 11.

The sheet room 51 is divided by the tray 55 and the bottom of the housing 101 of the optical system unit 100. The tray 55 slants downward from the opening 10 to the rear side (sheet feeding section). The bottom of the housing 101 of the optical system unit 100 slants downward more than the tray 55, and the sheet room 51 tapers. Sheets are placed on the tray 55 through the opening 10 which appears when the cover 11 is pivoted upward. The operator can set sheets on the tray 55 by sliding the sheets downward from the opening 10 along the tray 55. At that time, the upper and lower walls of the tapering sheet room 51 guide the leading edges of the sheets. Thus, the operator can easily set sheets in the printer.

The housing 101 of the optical system unit 100, as shown in FIG. 21, has recesses 102 on the bottom. The recesses 102 form an additional space for the operator's hand in the sheet room 51, and this space enables the operator to take small sizes of sheets such as postcards out of the room 51 easily.

Sheet Feeding Mechanism

Figure 7:
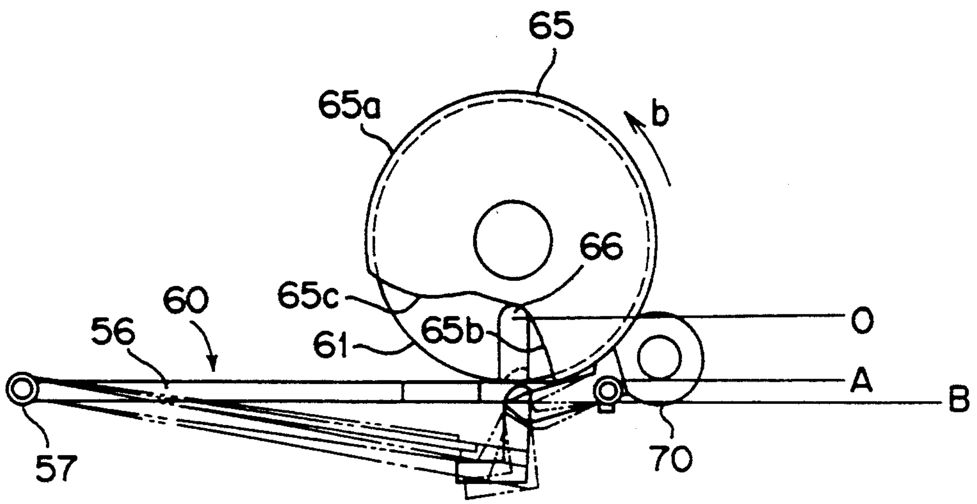
FIG. 7 is a side view of the sheet feeding mechanism.

A sheet feeding mechanism 60 is disposed in the rear side of the sheet room 51, that is, a place the leading edges of sheets set in the sheet room 51 reach. As shown in FIGS. 6 and 7, the sheet feeding mechanism 60 comprises the feed rollers 61 and 62, cams 65, push-up sticks 66, a sheet separation pad 67, and pinch rollers 70. The pad 67 can be pressed against the feed roller 61, and the pinch rollers 70 can contact with the respective feed rollers 62 to be rotated lead by the rollers 62. A sheet push-up plate 56 is disposed in the rear side of the tray 55, and the push-up plate 56 is pivotable on a pin 57 upward and downward in respect to the tray 55. The sheet push-up plate 56 and the push-up sticks 66 are integrated. The cams 65 are disposed on a supporting shaft of the feed roller 61 at both ends, and each of the cams 65 has an arc portion 65*a* and curve portions 65*b* and 65*c*. The push-up sticks 66 are always urged upward by spring members (not shown), and the ends of the push-up sticks 66 touch the circumferences (arc portion 65*a* and curve portions 65*b* and 65*c*) of the respective cams 65.

Figure 8:
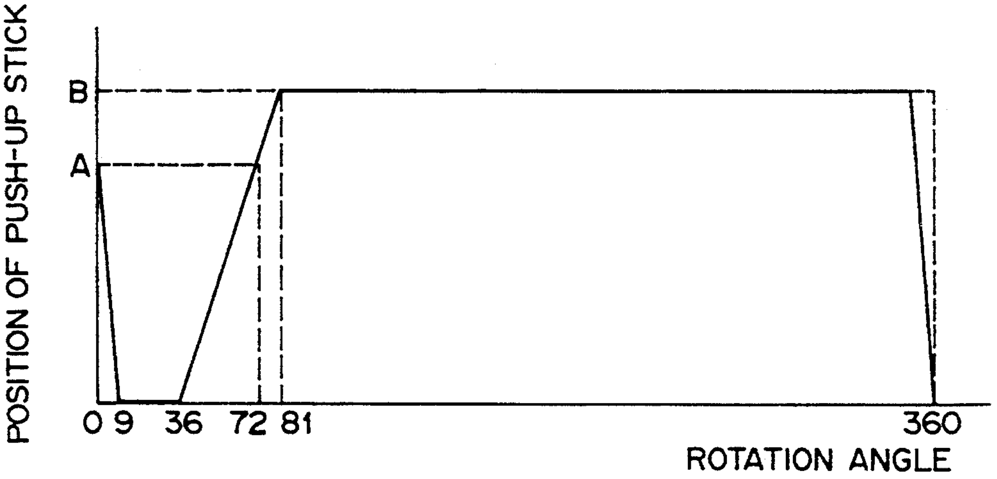
FIG. 8 is a graph plotting rotation angle of feed rollers versus position of push-up sticks.
Figure 9A:
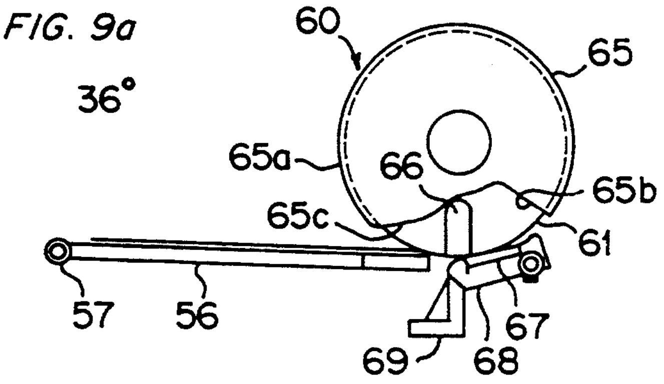
Figure 9B:
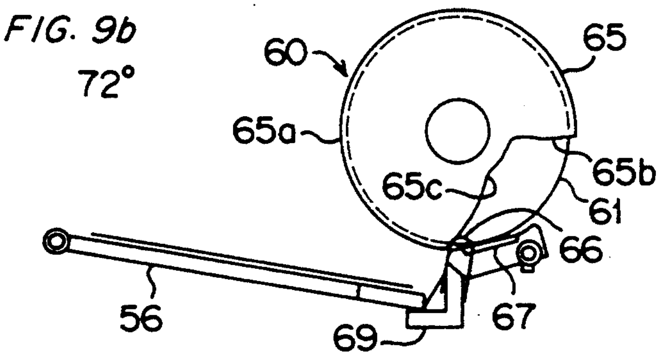
Figure 9C:
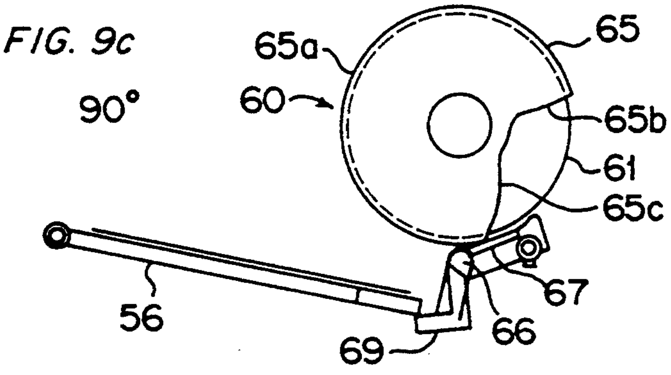
Figure 9D:
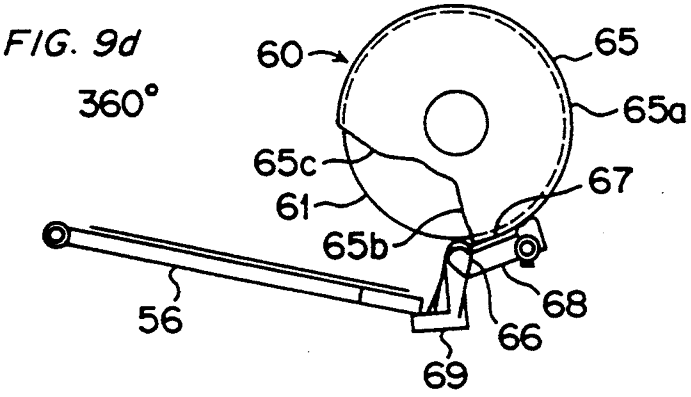

The feed roller 61 and the cams 65 make one whole rotation in a direction of arrow b to feed out a single sheet. At a start of feeding (when the rotation angle of the cams 65 is 0 degree), the push-up sticks 66 touch the ends of the arc portions 65*a* of the respective cams 65. In this state, the arc portions 65*a* prevent the push-up sticks 66 from pivoting upward although the spring members pull the push-up sticks 66, and the push-up plate 56 and sheets thereon are separated from the feed rollers 61 and 62. When the feed rollers 61 and 62, and the cams 65 are rotated in the direction of arrow b, the edges of the push-up sticks 66 move upward, guided by the curve portions 65*b* of the respective cams 65. Then, when the cams 65 are rotated by 9 degrees, as shown in FIG. 8, the push-up plate 56 becomes horizontal, and the leading edges of the sheets thereon come into contact with the feed rollers 61 and 62. The topmost sheet starts to be fed out by rotation of the feed rollers 61 and 62. As shown in FIG. 8, when the rotation angle of the cams 65 becomes 36 degrees, the push-up sticks 66 start moving downward, guided by the curve portions 65*c* of the respective cams 65, and the downward movement of the push-up sticks 66 is continued until the rotation angle of the cams 65 becomes 81 degrees. On the way, when the rotation angle of the cams 65 becomes 72 degrees, the push-up sticks 66 come to a position A as shown in FIG. 9*b*, and the push-up plate 56 pivots downward. Thereby the sheets on the plate 56 are released from the pressure of the feed rollers 61 and 62. The leading edge of the fed-out sheet is nipped between the feed rollers 62 and the pinch rollers 70, and as the feed rollers 62 are rotating, the sheet is transported right-upward in FIG. 1 to the sheet guide slit 153 of the cartridge 150. When the feed roller 61 has made a whole rotation, the leading edge of the fed-out sheet is nipped between the photosensitive drum 160 and the transfer roller 180. Then, the feed roller 61 stops rotating, and the sheet is further transported by rotation of the photosensitive drum 160.

The sheet separation pad 67 is urged toward the feed roller 61 by a spring member (not shown) so as to contact with the feed roller 61. While the sheets on the upward pivoted push-up plate 56 are in contact with the feed roller 61 (the rotation angle of the cams 65 is from 9 degrees to 72 degrees), the pad 67 is in contact with the feed roller 61 to prevent double-feeding (feeding more than one sheet at a time). Then the push-up sticks 66 move downward with the rotation of the cams 65, and accordingly the push-up plate 56 pivots downward. In this state (the rotation angle of the cams 65 is from 72 degrees to 360 degrees), the push-up plate 56 pushes down a tab 69 of a pad holder 68, and the pad 67 is separated from the feed roller 61. The tab 69 also acts as a regulation member for regulating the leading edges of sheets set on the tray 55.

The sheet feeding mechanism 60 feeds a sheet upward along the circumference of the feed roller 61 without feeding horizontally. The sheet feeding mechanism 60 of the above structure realizes a short sheet passageway in the printer, which contributes to the compactness of the printer.

The sheet feeding mechanism 60 may be so made that the feed roller 61 mainly provides a feeding force to a sheet and that the feed rollers 62 have a smaller diameter than the roller 61 so as to act as auxiliary members. In this case, the auxiliary feed rollers 62 cooperate with the pinch rollers 70 to feed a sheet. Also, the feed roller 61 may be shaped into a half cylinder whose cross section is a half circle.

Image Formation Cartridge

Referring to FIG. 10, the photosensitive drum 160, the charging brush 171, the developing device 172, the transfer roller 180 and the cleaning blade 185 are contained in the housing 151, and form the image formation cartridge 150. The developing device 172 has a developing sleeve 173, and toner is filled in a toner tank 174 separated from the developing device 172 by a wall 155. The toner is supplied to the developing sleeve 173 through a window 155*a* by rotation of a paddle wheel 175 in a direction of arrow c.

Figure 3:
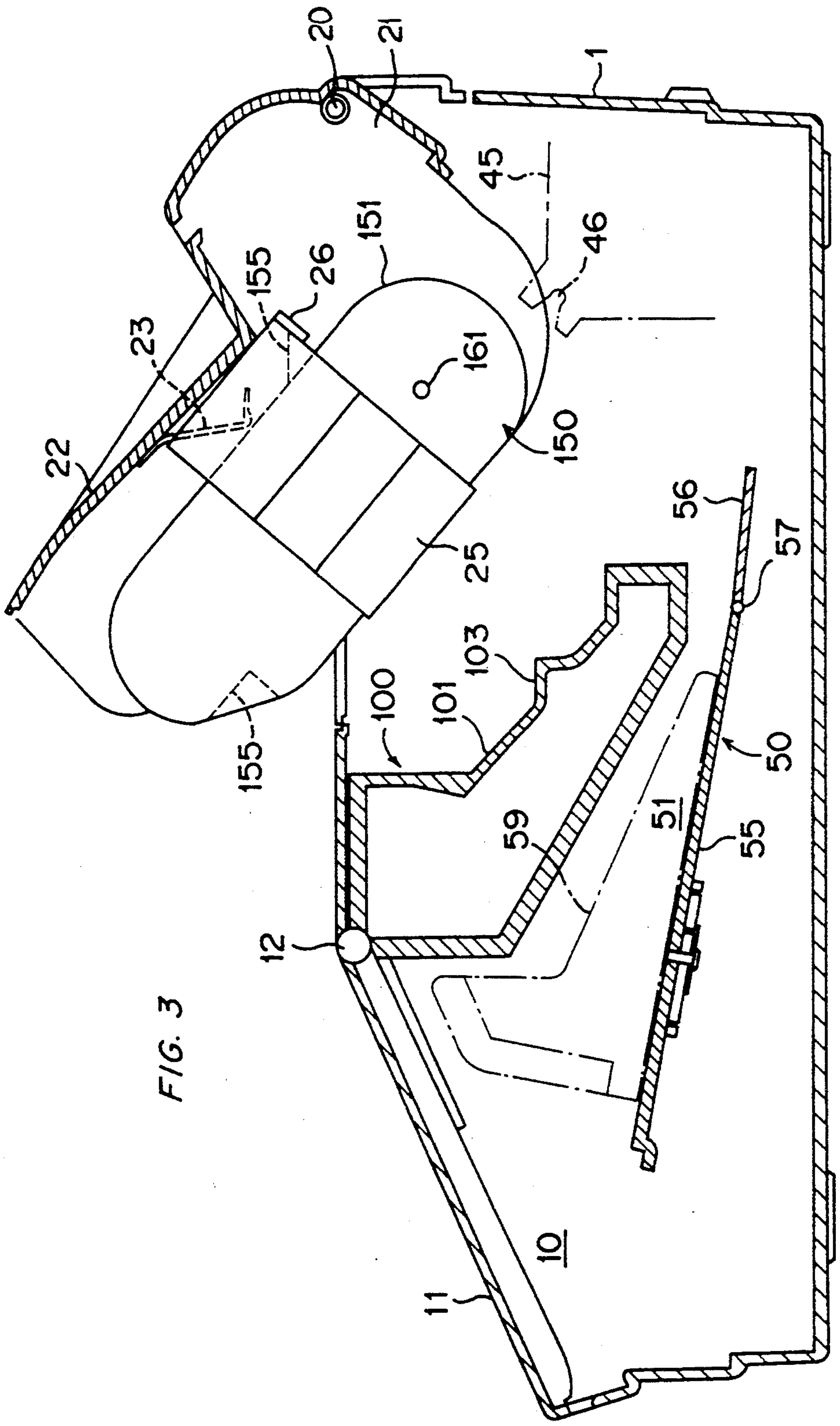

The laser beam slit 152, and the sheet guide slits 153 and 154 are formed on the housing 151. In the room 186 formed in the housing 151 at the upper part, rubbish toner removed from the photosensitive drum 160 by the cleaning blade 185 is stored. The image formation cartridge 150, as shown in FIG. 3, can be mounted in and dismounted from a cartridge holding frame 21 which is pivotable on a shaft 20 fastened to the body frame 1. The holding frame 21 has a holder 25 shown in FIGS. 12 and 13, and the image formation cartridge 150 is mounted in the holder 25. The image formation cartridge 150 is exchanged with a new one when the photosensitive drum 160 comes to the end of its life or when the toner in the toner tank 174 is used up. In order to exchange the cartridge 150 with a new one, the holding frame 21 is lifted to a position shown in FIG. 3. The cartridge 150 has two projections 155 on the upper side of the housing 151, and the holder 25 has two projections 26 in its upper part. When the projections 155 come into contact with the projections 26, it is judged that the cartridge 150 is mounted in the holder 25 correctly. Then, a spring plate 23 disposed on the back side of an upper surface 22 of the holding frame 21 presses the cartridge 150 against the holder 25 so as to keep the cartridge 150 set in the holder 25 (see FIG. 3). The holding frame 21 is set in the body frame 1 by pivoting the holding frame 21 downward from the cartridge exchange position. More specifically, the image formation cartridge 150 mounted in the holding frame 21 is set in the body frame 1 by engaging a shaft 161 of the photosensitive drum 160, which shaft 160 protrudes from both sides of the housing 151, with a groove 46 of a frame 45 fixed on the body frame 1 and engaging a concavity 155 formed on the bottom surface of the housing 151 with a convexity 103 formed on the housing 101 of the optical system unit 100.

Regarding setting of the cartridge 150 in the body frame 1, positioning of the photosensitive drum 160 is the most significant. In this embodiment, as described above, the setting of the cartridge 150 is based on the positioning of the photosensitive drum shaft 161, and therefore the photosensitive drum 160 can be positioned accurately. Also, in this embodiment, the setting of the cartridge 150 is based on the engagement of the concavity 155 on the cartridge housing 151 with the convexity 103 on the optical system unit housing 101 near a laser beam exit portion 105. Thereby, the laser beam slit 152 of the cartridge 150 can be positioned correctly in respect to the laser beam exit portion 105.

The configuration of the housing 151 is hereinafter described, referring to FIGS. 11 and 12.

The surface of the housing 151, as a whole, is gently curved. The housing 151 has a convexity 151*a* projecting in a mounting direction indicated by arrow X, and a convexity 151*b* projecting in a dismounting direction (the opposite direction to arrow X). A middle portion 151*c* between the convexities 151*a* and 151*b* is a gently-sloped flat. The convexities 151*a* and 151*b* are almost cylindrical whose axes are perpendicular to the mounting direction X.

The above configuration of the housing 151 gives the operator a favorable image of the image formation cartridge 150. The gentle curve helps the operator in believing that the cartridge 150 is easy to handle. The operator holds the convexity 151*b* of the housing 151 in exchanging the cartridge 150 with a new one, and at that time the round convexity 151*b* agrees with his/her palm. Further, the configuration of the housing 151 is convenient for packing the cartridge 150. The gentry-curved surface does not damage the packing.

More specifically, it is preferred that the convexity 151*b* has a height of 2 to 8 centimeters, which is a size the operator is easy to hold. Also, a rough portion 151*d* (see FIG. 11) may be formed on the convexity 151*b* in order to prevent the cartridge 150 from slipping out of the operator's hand.

As shown in FIG. 10, the photosensitive drum 160, the developing device 172, the transfer roller 180 and the cleaning blade 185 are disposed at the side of the convexity 151*a* of the housing 151, centering the photosensitive drum 160. Toner smoke occurs around these image forming elements. The toner smoke leaks through the laser beam slit 152 and smudges the optical system unit 100. In this embodiment, the photosensitive drum 160 is disposed away from the optical system unit 100, and the laser beam slit 152 is long. Accordingly smudging of the optical system unit 100 with the toner smoke can be inhibited. Also, because the laser beam path in the cartridge 150 is long, the photosensitive drum 160 can be shielded from outside light without a shutter.

Sheet Passageway

The sheet passageway, as shown in FIG. 1, is formed by the sheet storing unit 50, the sheet feeding mechanism 60, a vertical path 80 and sheet ejection means 210. The vertical path 80 is formed in the rear side of the body frame 1, and the vertical path 80 comprises the feed rollers 61 and 62, the pinch rollers 70, the sheet guide slits 153 and 154, the photosensitive drum 160, the transfer roller 180 and the fixing device 200.

The sheet ejection means 210 consists mainly of ejection rollers 211, a discharge roller 212 and the tray 220. As shown in FIGS. 14 and 16, the tray 220 is fastened to a sheet ejection switching block 25 in such a manner that the tray 220 can pivot on a shaft 221. The block 25 has a diverter 30 for switching sheet ejection between a face-up ejection mode and a face-down ejection mode. The diverter 30 pivots on a pin 31, and it is connected with an end of a cover 32 through a lever 34. The cover 32 pivots on a pin 33, and the operator can open and close the cover 32. When the cover 32 closes an opening 26 of the block 25, the diverter 30 is positioned on the same plane as a guide surface 27 and guides a sheet transported from the ejection rollers 211 by using a surface 30*a* (see FIG. 15). In this state, the sheet is discharged through an ejection port 24 via the discharge roller 212 onto the tray 220 covering the body frame 1. When long sheets are discharged from the printer, the cover 11 of the body frame 1 is set to the position (II) so as to act as a sheet receiver.

The tray 220 can be set in an upright position protruding over the block 25 as indicated by the two-dot chain line in FIG. 1. In the face-up ejection mode, as shown in FIG. 16, the tray 220 is pivoted to the rear side and set upright, and the cover 32 is pulled open. Thereby, the diverter 30 advances into the face-down ejection path, and the diverter 30 guides a sheet transported from the ejection rollers 211 by using its reverse side 30*b*. In this state, the sheet is discharged onto the tray 220 with its printed side facing to the front.

Further, a pair of rollers must be provided in the block 25 to transport sheets onto the tray 220 in the face-up ejection mode, although it is not shown in the drawings. The opening and closing action of the cover 32 may be coupled with the pivoting of the tray 220.

When the laser beam printer is so constituted that only the face-down ejection mode is available, as shown in FIGS. 17 and 18, a sheet guide block 40 is provided on the holding frame 21 instead of the ejection switching block 25. In this case, a sheet is provided with a transporting force by the ejection rollers 211, and diverted to the front by a guiding surface 41. Then, the sheet is discharged onto the upper surface 22 of the holding frame 21 and an upper surface 2 of the body frame 1 with its printed side facing down.

In this embodiment, since the sheet passageway is formed along the inner surface of the body frame 1 as described above, the printer is compact as a whole. In the face-down ejection mode, sheets are ejected to the front side, which is convenient to the operator. Also, the space inside the body frame 1 is used effectively by surrounding the image formation cartridge 150 with the sheet feeding mechanism 60, the vertical path 80 and the ejection means 210. The fixing device 200 is disposed in the rear side, above the vertical path 80. Therefore heat radiation from the fixing device 200 is good, and there is no fear that the operator may touch the fixing device 200 from his/her carelessness when treating sheet jamming or checking the inside of the body frame 1 for maintenance. In the face-up ejection mode, sheets are ejected onto the tray 220 with their printed sides facing to the front. Therefore the operator can check printed images immediately, staying in a position to operate the printer. Since the tray 220 is set upright on the body frame 1, a horizontal space for the tray 220 is not necessary.

Uncovering of Sheet Passageway

Figure 2:
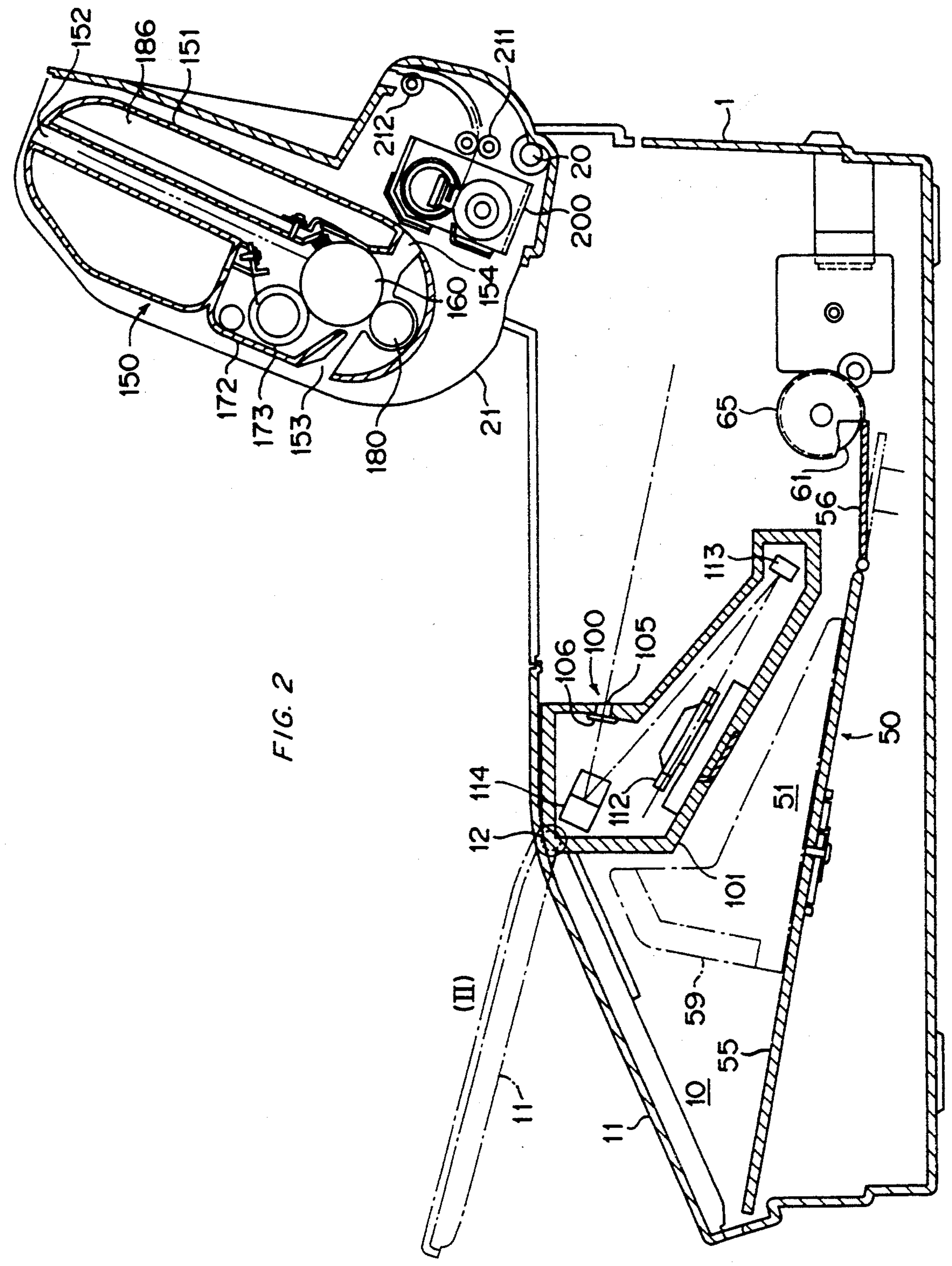
FIGS. 2 and 3 are sectional views of the laser printer in a state that an image formation cartridge is pivoted upward.

The image formation cartridge 150 is pivoted upward with the holding frame 21 when it is dismounted from the body frame 1 (see FIG. 3). The cartridge 150 can be pivoted further to an upright posture (see FIG. 2). In this state, the operator treats sheet jamming and checks the inside of the printer body for maintenance.

However, in the structure wherein the cartridge 150 is pivotable, and the photosensitive drum 160 and the transfer roller 180 are always pressed against each other, troubles may occur when uncovering the sheet passageway. Specifically, when a sheet is stuck between the photosensitive drum 160 and the transfer roller 180 and also nipped by other transporting means, if the cartridge 150 is pivoted upward to uncover the sheet passageway, the sheet may be torn up, or the photosensitive drum 160 may have a scratch. In order to prevent such troubles, sheet transporting means which is downstream of the transfer section, namely, the fixing device 200 and the ejection rollers 211 are fastened to the holding frame 21 integrally with the cartridge 150. For treatment of sheet jamming which occurs between the feed rollers 62 and the pinch rollers 70, the following arrangement is provided in this embodiment. The pinch rollers 70 are each coupled with levers 71 which are pivotable on a shaft 72. While the cartridge 150 is in a position to form an image (see FIG. 1), the convexity 151*a* of the cartridge housing 151 pushes down edges of the levers 71, and the pinch rollers 70 are urged clockwise and contact with the feed rollers 62. When the cartridge 150 is pivoted upward, the levers 71 are released from the convexity 151*a*. Accordingly, the pinch rollers 70 move downward due to their own weights, that is, separate from the feed rollers 62, and the levers 71 pivot counterclockwise. With this arrangement, the jammed sheet is released from the feed rollers 62 and the pinch rollers 70 when the cartridge 150 is pivoted upward. This helps prevent the troubles above.

Optical System Unit

The housing 101 of the optical system unit 100, as shown in FIGS. 19 and 20, contains a light source unit 110 including a semiconductor laser and a collimator lens, a reflection mirror 111, a polygon mirror 112, a reflection mirror 113, a toroidal mirror 114 and a sensor 115 for detecting a scan starting position. A laser beam is radiated from the light source unit 110, modulated in accordance with image data. The laser beam is reflected by the mirror 11, and scanned on a surface at a constant angular velocity by the polygon mirror 112. Further the laser beam is reflected by the mirror 113 and the toroidal mirror 114. Then the laser beam enters the slit 152 of the cartridge 150 through the window 105 formed on the housing 101, and images on the photosensitive drum 160.

The window 105 has a glass 106 and a shutter 120 as shown in FIG. 1. The shutter 120 is pivotable on a pin 122, and a lever 121 of the shutter 120 protrudes from the housing 101. When the image formation cartridge 150 is set in the image forming position, a projection (not shown) of the holding frame 21 contacts with the lever 121, and the shutter 120 pivots upward to open the window 105. When the holding frame 21 is pivoted upward together with the cartridge 150, the lever 121 is released from the projection, and the shutter 120 pivots downward due to its own weight to close the window 105.

The polygon mirror 112 is disposed on the bottom of the housing 101, on the flat surface 103 between the recesses 102 (see FIG. 21). The polygon mirror 112 and the other optical elements are required to be installed in specified positions accurately, and therefore they are disposed on a flat surface of the housing 101. The recesses 102, which are to enable the operator to put his/her hand in the sheet storing unit 50, are formed where no optical elements are fitted.

In this embodiment, some arrangements are provided to protect the operator from the laser beam. One of them is that the laser beam is outputted from the optical system unit 100 toward the rear side of the body frame 1. Another is a safety circuit for stopping the laser beam radiation from the light source unit 110 when a sensor (not shown) detects that the holding frame 21 is pivoted upward. As described above, the shutter 120 closes the window 105 when the holding frame 21 is pivoted upward. This is a supplementary safety device. Further, the convexity 151*b* of the cartridge housing 151 has a black-colored part around the entrance of the laser beam slit 152. If the cartridge 150 is pivoted upward in a state that the laser beam is still outputted, the laser beam will be reflected by the surface of the housing 151, and may proceed to the operator. Coloring part of the housing 151 into black is to make the part non-reflective, which prevents the reflection of the laser beam toward the operator. Alternatively, the part of the housing 151 around the entrance of the slit 152 may be finished as a light-diffusing surface by sandblasting.

The reflection mirror 113 is disposed above the rear side of the sheet storing unit 50, and therefore the optical path of the optical system unit 100 is partly formed between the image formation cartridge 150 and the sheet storing unit 50. Thus the space inside the body frame 1 is used effectively, which helps make the printer as a whole compact.

Although the present invention has been described in connection with the embodiment above, it is to be noted that various changes and modifications are apparent to those who are skilled in the art. Such changes and modifications are to be understood as being within the scope of the invention defined by the appended claims.

What is claimed is:

1. An image forming apparatus comprising:

a body of the apparatus;

said body having a front side, said front side being the side of the apparatus at which an operator is intended to be during operation of the image forming apparatus;

means for storing sheets therein along a bottom of the body of the apparatus;

means for feeding the sheets stored in the sheet storing means one by one out of the sheet storing means in a direction toward a rear side of the body of the apparatus;

a sheet path for leading each sheet fed by the sheet feeding means upward;

means for forming an image on the sheet traveling in the sheet path; and means for ejecting the image-formed sheet toward the front side of the apparatus onto a sheet receiving portion disposed on an upper side of the body.

2. An image forming apparatus as claimed in claim 1, wherein the image forming means is made as a unit comprising a photosensitive member and a developing device, and the unit is mounted in the body of the apparatus in such a manner to be surrounded by the sheet storing means, the sheet path and the sheet ejecting means.

3. An image forming apparatus as claimed in claim 2, further comprising an optical system for exposing the photosensitive member to a laser beam modulated in accordance with image data, the optical system being partly located between the image forming means and the sheet storing means.

4. An image forming apparatus as claimed in claim 1, further comprising:

means for holding the image-formed sheet upright; and means, which is disposed immediately before an exit of the sheet path, for switching the destination of the image-formed sheet between the sheet receiving portion disposed on the upper side of the apparatus and the upright sheet holding means.

5. An image forming apparatus as claimed in claim 1, wherein the sheet feeding means comprises:

a feed roller; and a pinch roller in contact with the feed roller for directing a sheet to travel along a circumference of the feed roller.

6. An image forming apparatus comprising:

a body of the apparatus;

an image forming section in the body;

an opening formed on a front side of the body of the apparatus, through which opening a plurality of unsupported sheets are inserted in the body;

a sheet storing means formed in the body for receiving and storing the unsupported sheets inserted through the opening in a stack; and means for feeding the sheets stored in the sheet storing means to an image forming section one by one;

said sheet storing means receives said sheets at a same position in which said sheets are fed from said sheet storing means.

7. An image forming apparatus as claimed in claim 6, further comprising a cover member which is movable between a position to cover the opening and a position to uncover the opening.

8. An image forming apparatus as claimed in claim 7, wherein the cover member is pivotable upward and downward on its rear side and uncovers the opening when the cover member pivots upward.

9. An image forming apparatus as claimed in claim 8, wherein the cover member is made of a transparent material.

10. An image forming apparatus as claimed in claim 8, further comprising means for ejecting image-formed sheets onto an upper side of the body, wherein the cover member pivots upward to hold leading portions of the ejected sheets.

11. An image forming apparatus as claimed in claim 6, wherein the sheet feeding means is disposed near edges of the sheets stored in the sheet storing section, which edges are farther from the opening, and the sheets are fed to the image forming section with the edges being leading edges.

12. An image forming apparatus as claimed in claim 11, wherein the sheet storing section slants downward from the opening to the sheet feeding means.

13. An image forming apparatus as claimed in claim 12, wherein the sheet storing section is divided by an upper wall and a lower wall, and tapers in a view from the opening.

14. An image forming apparatus as claimed in claim 13, further comprising an optical system for exposing a photosensitive member to a laser beam modulated in accordance with image data, wherein a bottom of a housing of the optical system serves as the upper wall of the sheet storing section.

15. An image forming apparatus as claimed in claim 14, wherein the bottom of the housing of the optical system which is the upper wall of the sheet storing section has recesses on both sides in respect to a sheet setting direction.

16. An image forming apparatus comprising:

an image formation cartridge containing a photosensitive member, a developing device, a transferring device and a cleaner; and means for holding the image formation cartridge and sheet transporting means disposed around the transferring device, the holding means being movable between a first position in which an image formation cartridge may be removed and exchanged and a second position in which the image forming apparatus may be operated.

17. An image forming apparatus as claimed in claim 16, wherein the sheet transporting means includes a fixing device for fixing a toner image on a sheet by heat.

18. An image forming apparatus as claimed in claim 16, further comprising:

sheet transporting means which is not held by the holding means, the sheet transporting means having a pair of trollers which are in contact with and pressed against each other to transport a sheet; and means for separating the pair of rollers from each other in synchronization with movement of the image formation cartridge to the cartridge exchange position.

19. An image forming apparatus as claimed in claim 18, wherein the sheet transporting means which is not held by the holding means comprises a feed roller for feeding stacked sheets one by one and a pinch roller which is in contact with the feed roller.

* * * * *